United States Patent [19]

Chapman

[11] Patent Number: 4,900,379
[45] Date of Patent: Feb. 13, 1990

[54] METHOD FOR PRODUCING COMPOSITE MATERIALS

[75] Inventor: Michael R. Chapman, Federal Way, Wash.

[73] Assignee: The Boeing Company, Seattle, Wash.

[21] Appl. No.: 196,388

[22] Filed: May 20, 1988

[51] Int. Cl.⁴ ............................................. B29D 5/20
[52] U.S. Cl. ........................................ 156/64; 156/59; 156/350; 156/353; 364/468; 364/474.09
[58] Field of Search ............. 364/467.01, 468, 474.03, 364/474.09, 476; 264/40.1, 45.1; 156/59, 64, 277, 350, 378, 374, 384, 353, 366

[56] References Cited

U.S. PATENT DOCUMENTS

| | | | |
|---|---|---|---|
| 3,019,072 | 1/1962 | Bose et al. | 346/140 |
| 3,230,925 | 1/1966 | Blanz . | |
| 3,312,562 | 4/1967 | Miller . | |
| 3,731,648 | 5/1973 | Gerber et al. | 118/401 |
| 3,781,907 | 12/1973 | Gerber . | |
| 3,909,831 | 9/1975 | Marchio et al. . | |
| 4,025,928 | 5/1977 | Hou et al. | 346/140 A |
| 4,050,075 | 9/1977 | Hertz et al. | 346/140 R |
| 4,133,711 | 1/1979 | August et al. | 156/353 |
| 4,208,238 | 7/1980 | August et al. | 156/510 |
| 4,292,108 | 9/1981 | Weiss et al. | 156/259 |
| 4,351,688 | 9/1982 | Weiss et al. | 156/358 |
| 4,385,949 | 5/1983 | Fontes | 156/59 |
| 4,419,170 | 12/1983 | Blad . | |
| 4,534,813 | 8/1985 | Williamson et al. | 156/59 |
| 4,584,964 | 4/1986 | Engel | 118/697 |
| 4,591,402 | 5/1986 | Evans et al. | 156/350 |
| 4,640,222 | 2/1987 | Gerber | 118/697 |
| 4,696,707 | 9/1987 | Lewis et al. | 156/64 |

*Primary Examiner*—David Simmons
*Attorney, Agent, or Firm*—Seed and Berry

[57] ABSTRACT

An improved method for producing composite structures is disclosed. In accordance with the method, a first computer representation of the manner in which a plurality of plies are to be cut from a common fibrous material is provided and the representation used to cut the plies from the common material. A second computer representation of the manner in which the plurality of plies are combined to form the composite structure is used to control an ink-jet marking system to sequentially mark a partial composite with the location of a ply. After the partial composite is marked, the ply is manually placed and its placement inspected. The partial composite is then marked, using the ink-jet marking gantry, with the location of the next ply.

33 Claims, 3 Drawing Sheets

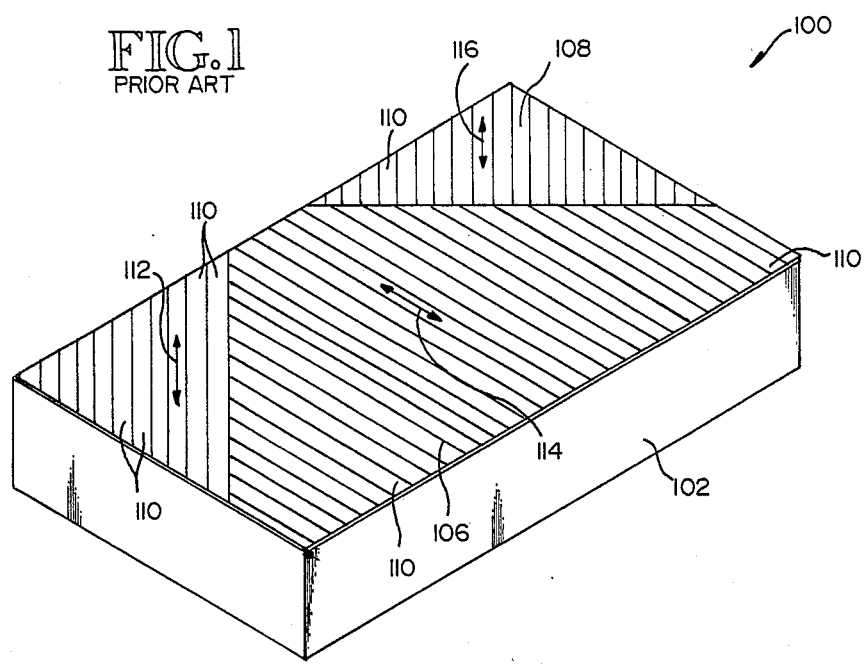
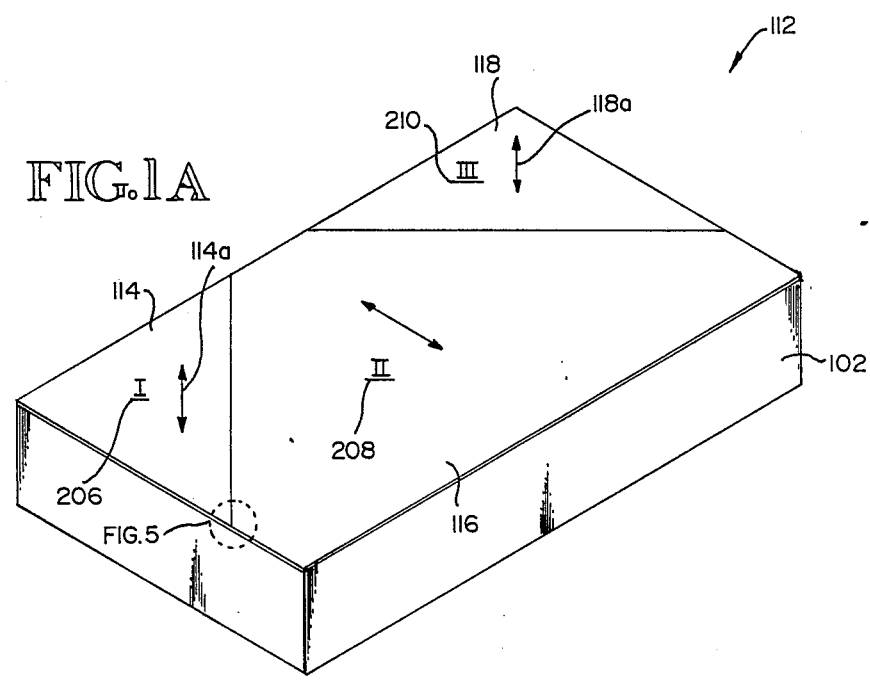

METHOD FOR PRODUCING COMPOSITE MATERIALS

STATEMENT OF GOVERNMENT RIGHTS

The Government has rights in this invention

TECHNICAL FIELD

The present invention is directed toward an improved method for producing high-performance composite materials.

BACKGROUND OF THE INVENTION

The recent widespread use of composite materials for aircraft structure has resulted in a heightened interest in reducing manufacturing costs while maintaining production quality and, consequently, performance standards. Typically, production of composite materials is a labor-intensive endeavor, resulting in extremely high production costs in terms of time and money.

For example, one prior art method for producing composite materials requires manual marking of a partially laid up composite using a cloth locating template (CLT) to indicate the positioning and orientation of the next ply which is to be placed. After the ply is placed, the cloth locating template must be replaced to ensure that the ply has been accurately laid. This method requires a large labor investment, resulting in large manufacturing costs of time and money.

Still other methods for producing composite materials rely upon automated placement of the three-inch wide graphite tape using automated tape-laying machinery. While this method greatly reduces the labor costs of producing the composite structures, the average time investment has proven to be unacceptable for various composite part designs.

Accordingly, it is desirable to provide a method for producing composite structures which requires minimum labor and money investments. It is also desirable to provide a method which minimizes the necessary labor and money investment while also minimizing the production time required to produce the composite structure. As always, it is desirable to provide such a method which results in composite structures that meet necessary performance specifications.

DISCLOSURE OF THE INVENTION

The present invention comprises a method for producing high-performance composite structures wherein the composite structure includes a plurality of fibrous plies. In accordance with the invention, a representation of the composite structure to be produced is provided. The representation includes the manner in which the plurality of fibrous plies are configured to produce the composite structure. The representation of the composite structure is then used to control an ink-jet marking gantry to mark the location of the next ply to be placed. The next ply is then placed in the marked location. The ink-jet marking gantry then continues to use the representation of the composite structure to mark the location of the plies until the composite structure is completed.

In a first alternative embodiment of the invention, the method discussed above further includes the steps of providing a representation of the plurality of plies. The representation of the plurality of plies includes the shape and size of each of the plurality of plies. The representation of the plurality of plies is then used to control a water-jet cutting gantry to cut the plurality of plies from a common fibrous material.

As presently preferred, the representations discussed above are provided as computer representations to be supplied to a respective control processor for controlling the ink-jet marking gantry and the water-jet cutting gantries.

BRIEF DESCRIPTION OF THE DRAWINGS

FIG. 1 is a perspective view of a partially laid up composite as developed in accordance with the prior art.

FIG. 1A is a perspective view of a partially laid up composite as developed in accordance with the method which is the subject of the present invention.

DETAILED DESCRIPTION OF THE PREFERRED EMBODIMENT

Figure 2:
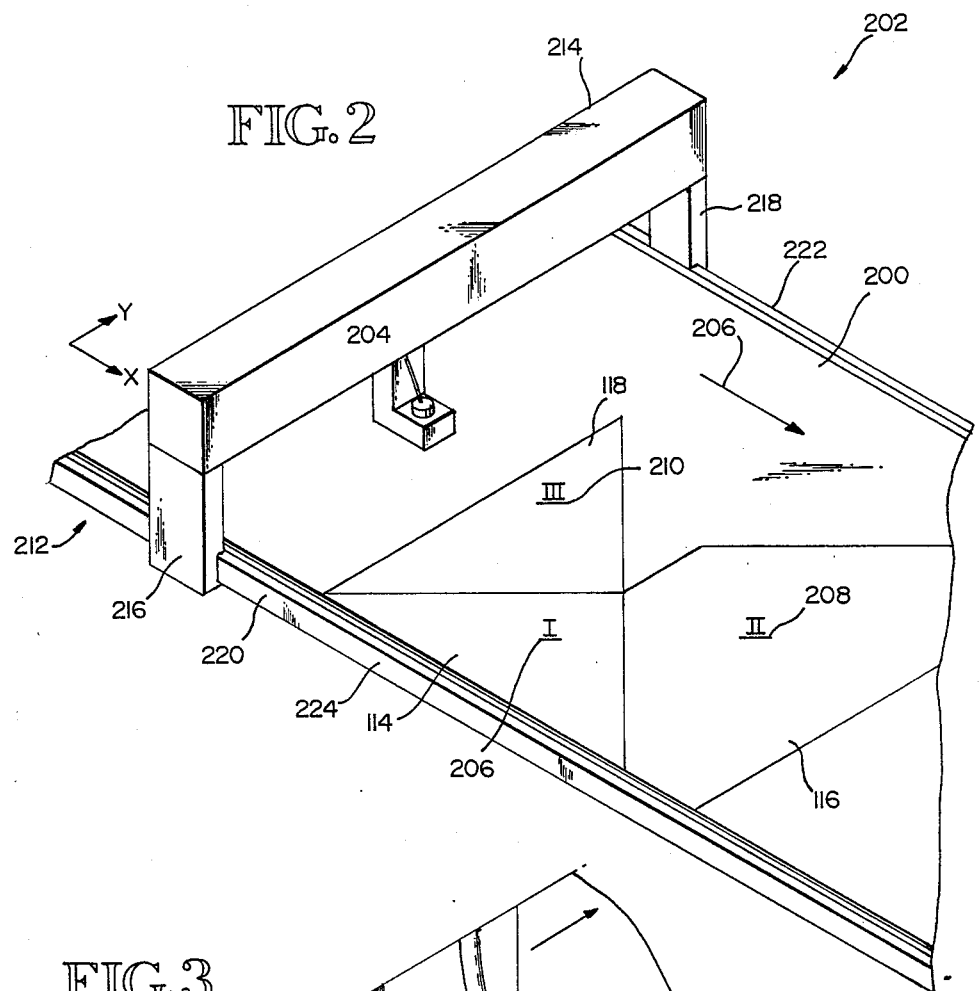
FIG. 2 is a partial illustrative view of a water-jet cutting gantry illustrating the manner in which the graphite plies are cut in accordance with the present invention.
Figure 3:
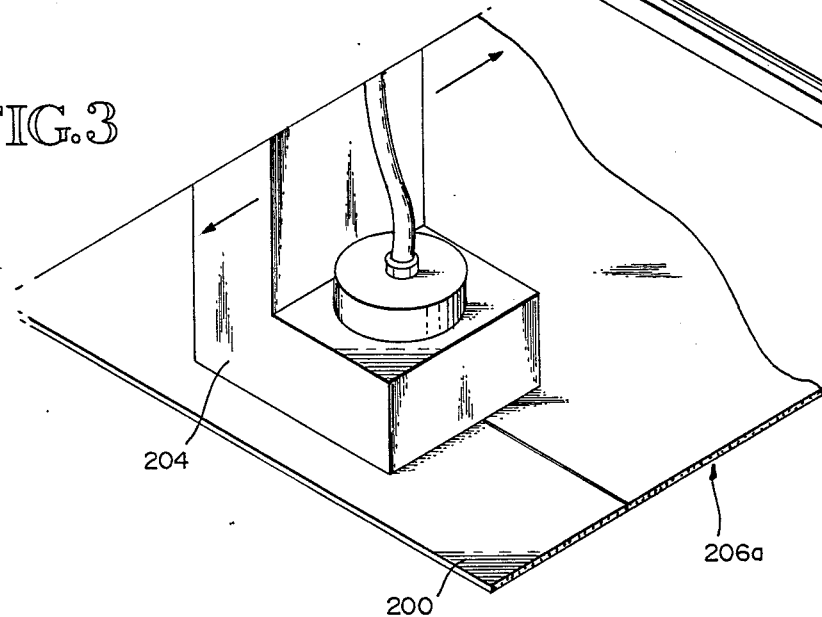
FIG. 3 is an illustrative view of the water-jet cutting apparatus illustrated in FIG. 2.

The present invention comprises a method for producing high-performance composite structures wherein the composite structures are to be combined to provide the structural components of an aircraft. As an example, several composite structures may be produced in accordance with the present invention and combined to provide detail parts for the wing of the aircraft. Although the present invention is described herein by reference to composite structures used as the skin for an aircraft wing, it will be apparent to those skilled in the art that the present invention could be used to produce composite structures which may then be combined for numerous applications, e.g., various vehicles, support structures, etc.

FIG. 1 is an illustration of a partially laid up composite 100 which has been produced in accordance with a prior art method. The partially laid up composite 100 of FIG. 1 includes a lay-up tool 102 which provides the outside form and configuration of the final composite structure. A plurality of composite plies 104–108 are sequentially laid upon lay-up tool 102 in a predetermined configuration and orientation. Each composite ply 104–108 comprises a plurality of graphite epoxy strips 110. The graphite epoxy strips each include a plurality of graphite fibers impregnated with an epoxy resin. The fibers of the strips 110 are aligned in a predetermined orientation, typically the longitudinal orientation of the strips 110, as shown by the arrows 112–116. In this manner, combining a plurality of strips 110 to form a ply, e.g., ply 104, such that the longitudinal axis of each strip of the ply is aligned, e.g., in the direction of arrow 112, all of the fibers which comprise the ply will likewise be aligned in the direction of the arrow 112.

As is known in the art, the desired orientation of each ply 104–108 is a function of the mechanical properties of the final composite material. By orienting each graphite epoxy strip 110 of a particular ply, e.g., ply 104, in a particular direction, e.g., the direction of arrow 112, the ply will exhibit predetermined mechanical properties. Accordingly, a composite ply is defined as a section of the partially laid up composite 100 wherein the graphite fibers are each in longitudinal alignment.

In accordance with the method of the prior art, the location, configuration and orientation of a particular composite ply, e.g., ply 104, is first manually marked on the partially laid up composite 100 using a cloth locating template (not shown). The template is then removed and the plurality of graphite epoxy strips 110 are manually placed in the position and orientation marked to develop the ply 104. After the ply 104 has been developed, the cloth locating template must be replaced to ensure that the ply 104 has been accurately located and oriented on the partially laid up composite 100. The cloth locating template is used again further along in the lay-up sequence to manually mark the location of subsequent plies, ply 106, and the entire process continued until the partially laid up composite is completely finished.

Those skilled in the art will appreciate that while FIG. 1 shows only a single layer of the partially laid up composite 100 for purposes of illustration, the final composite structure will in actuality include a multiplicity of layers. One wing skin panel of current design and manufacture comprises over 1500 plies.

In view of the foregoing discussion of the prior art, it is apparent that the prior art method for producing partially laid up composites is both costly and time-consuming. As an example, the aforementioned wing panel made in accordance with the method of the prior art which includes over 1500 plies would require 1200 man hours to lay up. Accordingly, the need for a more cost and labor-effective method for producing composite structures is apparent.

FIG. 1A is an illustration of a partially laid up composite 112 which is produced in accordance with the method of the subject invention. The partially laid up composite 112, like the partially laid up composite 100, comprises a plurality of plies 114–118. As will be discussed in more detail below, the plies 114–118 are each unitary graphite epoxy plies which are cut from a common composite material, i.e. the plies 114–118 are not comprised of a plurality of graphite epoxy strips 110. The direction of the graphite fibers of the plies 114, 116, 118 are indicated by the arrows 114A, 116A and 118A, respectively. Each ply 114, 116 and 118 includes an identifying marking 206, 208 and 210, as will be discussed in more detail below.

In accordance with the method of the subject invention, the plies 114–118 are each cut from a common fibrous material 200 using a water-jet cutting gantry 202 illustrated in FIG. 2. The common fibrous material 200 and the water-jet cutting gantry 202 are each supported on a cutting table 224. Like the graphite-epoxy strips 110, the common fibrous material 200 is comprised of a plurality of graphite fibers all aligned in the longitudinal direction of the common composite material 200, i.e., the direction of the arrow 206. In the presently preferred embodiment of the invention, common composite material 200 comprises 60 inch wide tape. It will be appreciated by those skilled in the art that other materials could be used in the invention.

The water-jet cutting gantry 202 comprises a cutting 204 movably supported by a water-jet gantry 212. The cutting head 204 comprises apparatus for producing a stream of water under extremely high pressure. As is known in the art, such apparatus is used for precision cutting of various materials. The cutting head 204 is supported for two directional movement by the water-jet gantry 212. The water-jet gantry 212 comprises a support beam 214 mounted to two side support members 216 and 218. The support members 216 and 218 are movably coupled to side rails 220 and 222 for movement therealong. The water-jet cutting gantry 200 may comprise any commercially available gantry system including a water jet cutter. The presently preferred water-jet cutting gantry was provided by Cambell Industry of West Virginia.

The cutting head 204 is movably mounted to the support beam 214 for movement along the longitudinal direction of the beam 214, i.e., the "Y" direction. Similarly, the support elements 216 and 218 are permitted to move along the side rails 220 and 222 to provide movement of the cutting head 204 along the longitudinal direction of the table 224, i.e., the "X" direction. Movement of the cutting head in the X and Y directions allows the plies to be cut from the common composite 200 in any desired size and shape. Preferably, mechanical means (not shown) are provided for moving the cutting head 204 along the support beam 214 in response to electrical or other signals. Similarly, mechanical means are preferably provided for moving the support elements 216 and 218 along the side rails 220 and 222.

In accordance with the present invention, a representation of the manner in which the plurality of plies are to be cut from the common fibrous material 200 is provided. It will be appreciated by those skilled in the art, that the representation to be provided must not only include the shape and size of each ply, but also the orientation of the cut ply relative to the alignment of the fibers which comprise the common fibrous material 200. This is because, as discussed above, the orientation of the fibers is determinative of the mechanical properties of the ply. In this regard it is noted that the fibers of the common fibrous material 200 are each aligned in the longitudinal direction of the material, i.e., the direction of the arrow 206. Hence, when the plies 114 through 118 are cut in the configuration as shown in FIG. 2, their fibers will be likewise aligned in the direction of the arrow 206. Each ply 114–118 must then be placed on the partially laid up composite 112 such that the directions of its fibers is aligned in the direction of the arrows 114A–118A.

It will be apparent to those skilled in the art that the representation of the manner in which the plies are to be cut may further be provided in a manner to maximize use of the common fibrous material 200. This is particularly so in applications, such as the present, wherein the order or sequence in which the plies are cut is not critical.

In a presently preferred embodiment of the invention, the water-jet cutting gantry 202 includes a process controller (not shown). The process controller of the water-jet cutting gantry 202 is of the type which includes its own memory for storing program as well as data information. In this embodiment, the representation discussed above comprises a computer representation of the plurality of plies 114 through 118 of the partially laid up composite 112. The computer representation includes the size and shape of each ply which is to be cut. Further, the computer representation includes the configuration and relative orientation of the plies such that the plies may be cut from the common fibrous material 200. As noted above, the orientation of the cut plies is particularly important as it is determinative of the direction of alignment of the ply's fibers, and hence, determinative of the plies mechanical properties.

In a further alternative embodiment of the invention, the plies 114–118 may have markings 206–210 which identify the respective plies. The markings 206–210 may be provided by any suitable means known in the art. As presently preferred, the markings 206–210 are provided by an ink-jet marking system, as will be described below.

Figure 4:
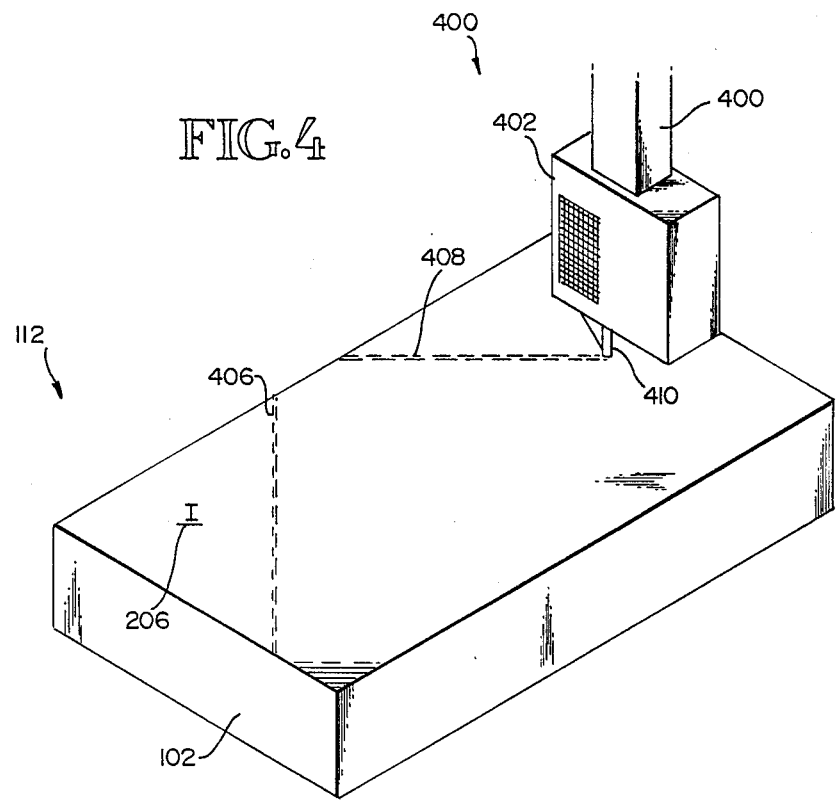
FIG. 4 is a partial illustrative view of the ink-jet marking gantry which is used to mark the partially laid up composite in accordance with the method which is the subject of the present invention.
Figure 5:
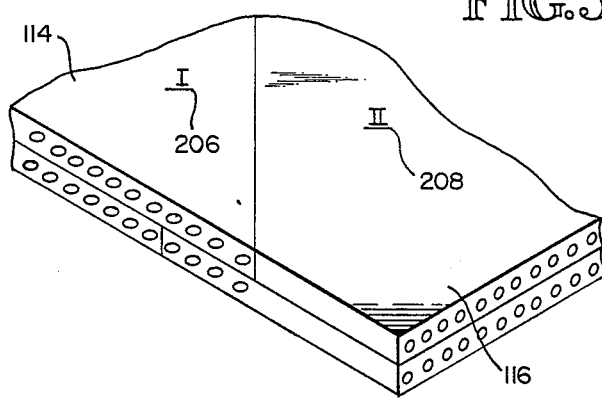
FIG. 5 is a partial sectional view of the partially laid up composite illustrated in FIG. 1A.

After the plies are cut and marked, they are ready to be placed on the partially laid up composite 112. In accordance with the subject method, the partially laid up composite 112 is first marked using an ink-jet marking gantry 400, as shown in FIG. 4. The ink-jet marking gantry 400 may comprise any suitable apparatus for marking the partially laid up composite 112, as described herein.

The the ink-jet marking gantry 400 comprises a marking head 402 which is movably supported on a ink-jet gantry (not shown) for movement in the X and Y directions. The gantry of the ink-jet marking gantry may be of a type similar to the water-jet gantry 212 of the water-jet cutting gantry 202 to provide to dimensional movement of the marking head 402. Like the cutting head 204, the marking head 402 may be movably supported by the ink-jet gantry for bi-directional movement. Further, mechanical means may also be provided for moving the marking head in response to electrical or other signals.

The ink-jet head 402 includes an ink-jet nozzle 410 for dispensing the marking fluid. The ink-jet nozzle 410 is preferably movably supported on a shaft 404 for movement in the Z direction. It will be apparent to those skilled in the art that movement of the marking head 402 in the Z direction further facilitates marking of three-dimensional lay-up tools 102, thus allowing accurate marking of the partially laid up composite 112 and, consequently, placement of the plies 114–118 on three-dimensional lay-up tools. Further, rotational movement of the marking head 402 and/or the ink-jet nozzle 410 may be desired to allow movement of the ink-jet nozzle 410 in more than three dimensions.

The ink-jet marking gantry 400 may comprise any device, or combination of devices presently available for marking the partially laid up composite 112 as described herein. In the presently preferred embodiment of the invention, the ink-jet marking gantry comprises apparatus which is readily available from Cincinnati Milicron, Inc.

To control the ink-jet cutting gantry 400, a representation of the manner in which the plurality of plies 114–118 are to be combined to produce the composite structure is provided. The representation includes the orientation and configuration of the plies 114–118 as well as information relating to the sequence in which the plies are placed.

As presently preferred, the ink-jet marking gantry 400 includes a control processor (not shown) for controlling the movement of the ink-jet nozzle 410. The control processor includes its own memory for storing program and data information. The ink-jet nozzle 410 and the ink-jet gantry each move in response to signals received from the control processor. The ink-jet nozzle 410 is further responsive to signals received from the control processor to mark the partially laid up composite 112.

In this embodiment, the representation of the manner in which the plurality of plies 114–118 are to be combined is provided as a computer representation which is stored in the memory of the control processor. The control processor, like the processor controller of the water-jet cutting gantry, thereby controls the operation of the ink-jet marking gantry 400 to control the marking of the partially laid up composite.

In operation, the plies 114–118 are first cut using the water-jet cutting gantry, as described above. Thereafter, the partially laid up composite 112 is marked, using the ink-jet marking gantry 400 to indicate the placement of the first ply 114. The first ply 114 is placed and its placement inspected for accuracy. If the ply 114 has been placed accurately to within predetermined tolerances, then the partially laid up composite 112 is marked to indicate the desired placement of the next ply 116. The process is continued until all of the plies are placed.

In a presently preferred embodiment of the invention, the partially laid up composite 112 is marked with a double line 406 to indicate an inner and outer boundary of the placing of the ply 114. The ply 114 is then manually placed within the inner line of the marking 406. Thereafter, manual inspection of the placement of ply 114 should reveal only the outer line of the marking 406. This method of double marking provides a simple yet accurate "go-no go" gauge to calibrate the placement of the ply 114. In a similar manner, the plies 116 and 118 are marked and placed.

It will be appreciated by those skilled in the art that a system similar to the ink-jet marking gantry 400 may be combined with the water-jet cutting gantry 202 to provide the markings 206 through 210 at the time the plies 114–118 are cut. Further, the ink-jet marking gantry 400 may be used not only to mark the preferable location of the ply but also to mark the ply location with the ply's identifying marking, e.g., mark 206 for ply 114 (as shown in FIG. 4).

Using the method of the present invention, composite structures may be produced in a manner which minimizes both the cost and labor investment. As an example, the aforementioned wing skin panel comprising over 1500 plies can now be produced in approximately 500 man hours which represents a significant reduction in comparison to 1200 man hours as described above for hand lay-up. Further, using the method of the present invention, ply placement is more readily provided within predetermined tolerances.

Further, the ink-jet marking gantry 400 may be sized to allow sequential marking of more than one partially laid up composite, i.e., such that a plurality of partially laid up composites may be positioned under the gantry. Hence, the first partially laid up composite may be marked and while the first ply is being placed, the second partially laid up composite may be marked. Accordingly, the computer representation of the composite structure to be produced should also include an identification of each composite structure such that the control processor will be able to index the plurality of partially laid up composite and thereby mark the right partially laid up composite for receiving the right ply.

It will be further apparent to those skilled in the art that the manner in which the representation of ply combination is provided may be maximized to minimize marking time while not affecting ply placement. As an example, it may be necessary to mark each side of an interior ply. However, plies which are on the periphery of the lay-up tool may require only that their interior sides are marked.

In the presently preferred embodiment of the invention, the novel cutting method is combined with the novel marking method to provide a cost and time effective method for producing composite structures. Those skilled in the art will appreciate, however, that the method for marking partially laid up composites which is disclosed herein may be combined with other known methods of producing the composite plies.

Although the invention has been illustrated and described herein by reference to several presently preferred embodiments thereof, it will be apparent to those skilled in the art that many modifications and variations of the present invention may be made without departing from the true scope and spirit of the invention. Accordingly, the invention should not be limited to the several embodiments shown and described above but should only be limited by the appended claims which follow.

I claim:

1. A method for producing high-performance composite structures wherein the composite structure consists of a plurality of fibrous plies, said method comprising the steps of:
   (a) providing a first computer representation of the manner in which the plurality of plies can be cut from a common elongate sheet of fibrous tape to maximize use of the tape, the first computer representation including the orientation and configuration of the plies to be cut and the identity of the plies;
   (b) storing the first computer representation in the memory of a first processor;
   (c) providing a second computer representation of the manner in which the plurality of plies are to be combined to create the composite structure, the second representation including the relative positioning and orientation of the plurality of plies as well as the sequence in which the plies must be combined to produce the composite structure;
   (d) storing the second computer representation in the memory of a second processor;
   (e) cutting the plies from the common elongate sheet of fibrous tape using a water-jet cutting gantry, the water-jet cutting gantry being controlled by the first processor and the first processor being controlled by the first computer representation;
   (f) identifying the plies by marking them using a first ink-jet marking gantry, the first ink-jet marking gantry also being controlled by the first processor;
   (g) marking a partial composite to indicate the positioning and orientation of the ply to be placed using a second ink-jet marking gantry, the second ink-jet marking gantry being controlled by the second processor and the second processor being controlled by the second computer representation;
   (h) placing the ply on the partial composite in the position and orientation marked; and
   (i) repeating steps (g) and (h) until all plies have been placed to thereby provide the desired high-performance composite structure.

2. The method as recited in claim 1, further comprising the step of inspecting the placement of each ply after each ply has been placed to ensure proper placement of the ply.

3. The method as recited in claim 1 wherein step (g), marking the partial composite, comprises the substep of marking an inner line to indicate the placement of the ply and marking an outer line to provide a means for inspecting the placement of the ply.

4. The method as recited in claim 3, further comprising the step of inspecting the placement of each ply after the ply has been placed to determine whether the entire portion of the outer line is visible and the entire portion of the inner line is not visible and thereby to determine whether the ply has been properly placed.

5. The method as recited in claim 1, further comprising the step of inspecting each ply after it has been placed to determine whether the ply overlaps any neighboring ply and, if so, ensuring that the amount of overlap is within a predetermined tolerance.

6. The method as recited in claim 1, further comprising the step of inspecting each ply after it has been placed to determine whether a gap exists between the ply and any neighboring ply and, if so, ensuring that the width of the gap is within a predetermined tolerance.

7. The method as recited in claim 1 wherein step (c), providing the second computer representation, comprises the substep of providing a plurality of second computer representations, each representation being associated with a particular high-performance composite structure, and wherein step (d), storing the second computer representation, comprises the substep of storing the plurality of second computer representations, the method further comprising the step of identifying the composite structure to be formed prior to marking the partial composite.

8. The method as recited in claim 7 wherein step (a), providing the first computer representation, comprises the substep of providing a plurality of first computer representations, each representation being associated with a particular high-performance composite structure, and wherein step (b), storing the first computer representation, comprises the substep of storing the plurality of first computer representations, the method further comprising the steps of:
   (j) identifying the composite structure to be formed prior to marking the plies; and
   (k) marking the plies to indicate the composite structure for which they are intended.

9. The method as recited in claim 8, further comprising the step of indexing the second ink-jet marking gantry to a plurality of partial composites such that a first composite structure can be developed on a first partial composite while a second composite structure is developed on a second partial composite, and wherein step (g), marking the partial composite, comprises the substep of marking the one of the plurality of partial composites which is to receive the next ply.

10. The method as recited in claim 1 wherein step (c), providing a second computer representation, comprises the substep of providing control data to the memory of the second processor to control multidimensional movement of the second ink jet marking gantry, and wherein step (g), marking the partial composite, comprises the substep of controlling the gantry to move the ink jet in response to the second representation and discharging ink from the ink jet, at locations determined by the second representation, to mark the partial composite.

11. The method as recited in claim 10 wherein the second computer representation comprises data to control at leas three dimensions of motion of the second ink-jet marking gantry to thereby allow accurate placement of plies for constructing three-dimensional configurations.

12. The method as recited in claim 1 wherein step (a), providing a first computer representation, comprises the substep of providing a unique identification to each ply such that the sequence in which the plies are to be placed can be determined from the identification marking.

13. A method for producing high-performance composite structures wherein the composite structure includes a plurality of fibrous plies, said method comprising the steps of:
  (a) providing a representation of the composite structure to be produced, wherein the representation includes the manner in which the plurality of fibrous plies are configured to produce the composite structure;
  (b) using the representation of the composite structure to control an ink-jet marking gantry to mark the location of the next ply to be placed;
  (c) placing the next ply in the location marked; and
  (d) repeating steps (b) and (c) until all plies have been placed to thereby provide the high-performance composite structure.

14. The method as recited in claim 13 wherein step (a), providing a representation of the composite structure, comprises the substep of providing a representation of the positioning and orientation of the plurality of plies.

15. The method as recited in claim 14 wherein step (b), using the representation of the composite structure to control the ink-jet marking gantry, comprises the substep of marking the position and orientation of the next ply to be placed.

16. The method as recited in claim 13 wherein step (b), using the representation of the composite structure to control the ink-jet marking gantry, comprises the substeps of:
  (e) responding to the representation of the composite structure to move the ink-jet marking gantry to a predetermined position, relative to a partial composite, which position is associated with the desired location of the next ply to be placed; and
  (f) controlling the ink-jet marking gantry to mark the partial composite in a manner to indicate the location of the next ply to be placed.

17. The method as recited in claim 16 wherein step (e), responding to the representation of the composite structure to move the ink-jet marking gantry, comprises the substep of moving the ink jet of the ink-jet marking gantry in a plurality of dimensions to thereby further the marking accuracy on three-dimensional partial composites.

18. The method as recited in claim 13 wherein step (a), providing the representation of the composite structure, comprises the substep of providing a computer representation of the composite structure including the configuration of the plurality of fibrous plies to construct the composite structure, and wherein step (b), using the representation of the composite structure to control the ink-jet marking gantry, comprises the substeps of:
  (f) storing the computer representation of the composite structure in the memory associated with a control processor; and
  (g) using the control processor to control the ink-jet marking gantry in accordance with the computer representation of the composite structure.

19. The method as recited in claim 13 wherein step (a), providing the representation of the composite structure, comprises the substep of providing a computer representation of several composite structure including the configuration of the plurality of fibrous plies to construct each composite structure, and wherein step (b), using the representation of the composite structure to control the ink-jet marking gantry, comprises the substeps of:
  (h) storing the computer representations of the composite structures in the memory associated with a control processor;
  (i) identifying the particular composite structure to be produced; and
  (j) using the control processor to control the ink-jet marking gantry in accordance with the computer representation of the identified composite structure.

20. The method as recited in claim 19 wherein the ink-jet marking gantry is adapted to mark a plurality of composite structures, said method further comprising the step of indexing the ink-jet marking gantry to the identified composite structure.

21. The method as recited in claim 13, further comprising the steps of:
  (k) providing a representation of the plurality of plies including the shape and size of each of the plurality of plies; and
  (l) using the representation of the plurality of plies to control a water-jet cutting gantry to cut the plurality of plies from a common fibrous material.

22. The method as recited in claim 21, further comprising the step of marking the plurality of plies to identify the plurality of plies by shape and size.

23. The method as recited in claim 21, further comprising the step of marking the plurality of plies to identify each ply, the identifying marking to include identification of the sequence in which the plurality of plies are to be combined to produce the composite structure.

24. The method as recited in claim 23 wherein step (l), using the representation of the plurality of plies, comprises the step of using the representation of the plurality of plies to control a water-jet cutting gantry to cut the marked plurality of plies from a common fibrous material.

25. The method as recited in claim 21 wherein step (k), providing a representation of the plurality of plies, comprises the step of providing a computer representation of the plurality of plies including the shape and size of each of the plurality of plies, and wherein step (i), using the representation of the plurality of plies to control a water-jet marking gantry, comprises the substeps of:
  (m) storing the computer representation of the plurality of plies in the memory of a process controller; and
  (n) using the process controller to control the water-jet cutting gantry in accordance with the computer representation of the plurality of plies.

26. The method as recited in claim 21 wherein step (a), providing the representation of the composite structure, comprises the step of providing a computer representation of the composite structure including the configuration of the plurality of fibrous plies to construct the composite structure, and wherein step (b), using the representation of the composite structure to control the ink-jet marking gantry, comprises the substeps of:
  (o) storing the computer representation of the composite structure in the memory associated with a control processor; and (p) using the control processor to control the ink-jet marking gantry in accordance with the computer representation of the composite structure.

27. The method as recited in claim 26 wherein step (k), providing a representation of the plurality of plies, comprises the step of providing a computer representation of the plurality of plies including the shape and size of each of the plurality of plies, and wherein step (l), using the representation of the plurality of plies to control a water-jet marking gantry, comprises the substeps of:

(q) storing the computer representation of the plurality of plies in the memory of a process controller; and (r) using the process controller to control the water-jet cutting gantry in accordance with the computer representation of the plurality of plies.

28. The method as recited in claim 27 wherein step (a), providing a computer representation of the composite structure, comprises the substep of providing a representation of the positioning and orientation of the plurality of plies.

29. The method as recited in claim 28 wherein step (p), using the control processor to control the ink-jet marking gantry, comprises the substep of marking the position and orientation of the next ply to be placed.

30. The method as recited in claim 27 wherein step (p), using the control processor to control the ink-jet marking gantry, comprises the substeps of:

(s) responding to the computer representation of the composite structure to move the ink-jet marking gantry to a predetermined position, relative to a partial composite, which position is associated with the desired location of the next ply to be placed; and (t) controlling the ink-jet marking gantry to mark the partial composite in a manner to indicate the location of the next ply to be placed.

31. The method as recited in claim 30 wherein step (s), responding to the computer representation of the composite structure to move the ink-jet marking gantry, comprises the substep of moving the ink jet of the ink-jet marking gantry in a plurality of dimensions to thereby further the marking accuracy on three-dimensional partial composites.

32. The method as recited in claim 27, further comprising the step of marking the plurality of plies to identify the plurality of plies by shape and size.

33. The method as recited in claim 27, further comprising the step of marking the plurality of plies to identify each ply, the identifying marking to include identification of the sequence in which the plurality of plies are to be combined to produce the composite structure.

* * * * *